United States Patent
Jia et al.

(10) Patent No.: US 10,040,050 B2
(45) Date of Patent: Aug. 7, 2018

(54) MICROWAVE SYNTHESIS OF COBALT TUNGSTATE FOR USE AS STABLE OXYGEN EVOLUTION CATALYST

(71) Applicant: Toyota Motor Engineering & Manufacturing North America, Inc., Erlanger, KY (US)

(72) Inventors: Hongfei Jia, Ann Arbor, MI (US); Kenneth James McDonald, Whitmore Lake, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 457 days.

(21) Appl. No.: 14/528,219

(22) Filed: Oct. 30, 2014

(65) Prior Publication Data

US 2016/0121294 A1 May 5, 2016

(51) Int. Cl.
*B01J 19/12* (2006.01)
*C01G 51/04* (2006.01)
*C25B 11/04* (2006.01)
*C25B 1/04* (2006.01)
(Continued)

(52) U.S. Cl.
CPC .......... *B01J 19/126* (2013.01); *C01G 51/40* (2013.01); *C25B 1/003* (2013.01); *C25B 1/04* (2013.01); *C25B 11/0452* (2013.01); *B01J 2219/1278* (2013.01); *C01P 2002/72* (2013.01); *C01P 2002/88* (2013.01); *C01P 2004/04* (2013.01); *C01P 2004/64* (2013.01);
(Continued)

(58) Field of Classification Search
CPC . B01J 19/126; B01J 2219/1278; C01G 51/40; C25B 1/003; C25B 1/04; C25B 11/0452; C01P 2002/72; C01P 2002/88; C01P 2004/04; C01P 2004/64; C01P 2006/12; C01P 2006/40; Y02E 60/368
See application file for complete search history.

(56) References Cited

U.S. PATENT DOCUMENTS

2004/0242412 A1* 12/2004 Gulla ................. B01J 21/18
502/216
2005/0136193 A1* 6/2005 Weidman ............ C23C 18/1619
427/437
(Continued)

OTHER PUBLICATIONS

Electronic Supplementary Information, Different catalytic behavior of amorphous and crystalline cobalt tungstate for electrochemical water oxidation. Jia et al. The Royal Society of Chemistry. 2012.*
(Continued)

*Primary Examiner* — Ciel P Thomas
(74) *Attorney, Agent, or Firm* — Dinsmore & Shohl LLP (57) ABSTRACT

A process of forming an oxygen evolution catalyst includes the steps of: providing $Co(NO_3)_4$; providing $Na_2WO_4$; combining the $Co(NO_3)_4$ and $Na_2WO_4$ forming a solution; exposing the solution to a source of microwave energy and initiating a hydrothermal reaction forming hydrated $CoWO_4$. The oxygen evolution catalyst including hydrated $CoWO_4$ may be used to split water into oxygen and hydrogen ions.

17 Claims, 9 Drawing Sheets

(51) Int. Cl.
*C01G 51/00* (2006.01)
*C25B 1/00* (2006.01)

(52) U.S. Cl.
CPC ...... *C01P 2006/12* (2013.01); *C01P 2006/40* (2013.01); *Y02E 60/368* (2013.01)

(56) References Cited

U.S. PATENT DOCUMENTS

| | | | |
|---|---|---|---|
| 2012/0267234 A1* | 10/2012 | Reece | B01J 19/127 204/157.5 |
| 2013/0158322 A1* | 6/2013 | Nyce | B01J 23/30 585/330 |
| 2013/0192999 A1 | 8/2013 | Jia et al. | |
| 2013/0202889 A1* | 8/2013 | Ham | C25B 1/003 428/402 |

OTHER PUBLICATIONS

Almeida, M. et al., Electronic and Magmetic Properties pf FeWO4 Nanostructures Synthesized by Microwave Assisted Hydrothermal Method, 2012, Brazil.

Kloprogge, J. Theo, et al., Microwave Assistaned Synthesis and Characterisation of Divalent Metal Tungstate Nanocrystalline Materials: Ferberite, Hübnerite, Sanmartinite Scheelite and Stolzite, Materials Chemestry and Physics, 2004, pp. 438-443, vol. 88, School of Physical and Chemichal Sciences, Brisbane, Australia.

Sczancoski, J.C., et al., SrMoO4 Powders Processed in Microwave-hydrothermal: Synthesis, Characterization and Optical Properties, Chemicha Engineering Journal, 2008, pp. 632-637, vol. 140, Brazil.

\* cited by examiner

Fig. 1A

Amorphous CoWO$_4$
(precursor)

Fig. 1B

Hydrated CoWO$_4$
(microwave, 1 minute at 200°C)

Fig. 1C

Crystalline CoWO$_4$
(microwave, 10 minute at 200 °C)

| Temp | Dwelling Time less than (min) |
|---|---|
| 240 | 0 |
| 230 | 1 |
| 220 | 2 |
| 210 | 3 |
| 200 | 4 |
| 190 | 9 |
| 180 | 21 |
| 170 | 45 |
| 160 | 90 |

MICROWAVE SYNTHESIS OF COBALT TUNGSTATE FOR USE AS STABLE OXYGEN EVOLUTION CATALYST

CROSS-REFERENCE TO RELATED APPLICATIONS

Not applicable.

FIELD OF THE INVENTION

The invention relates to a process of forming an oxygen evolution catalyst and apparatus of using cobalt tungstate as a catalyst for the electrochemical and photochemical-electrolysis of water, and in particular to a process and apparatus using hydrated cobalt tungstate as a catalyst for the oxidation of water.

BACKGROUND OF THE INVENTION

Hydrogen has long been considered an ideal fuel source, as it offers a clean, non-polluting alternative to fossil fuels. One source of hydrogen is the splitting of water into hydrogen ($H_2$) and oxygen ($O_2$), as depicted in equation (1).

$$2H_2O \rightarrow O_2 + 2H_2 \quad (1)$$

In an electrochemical half-cell, the water-splitting reaction comprises two half-reactions:

$$2H_2O \rightarrow O_2 + 4H^+ + 4e^- \quad (2)$$

$$2H^+ + 2e^- \rightarrow H_2 \quad (3)$$

and hydrogen made from water using sunlight prospectively offers an abundant, renewable, clean energy source. However, the oxygen evolution half reaction is much more kinetically limiting than the hydrogen evolution half reaction and therefore can limit the overall production of hydrogen. As such, efforts have been made to search for efficient oxygen evolution reaction (OER) catalysts that can increase the kinetics of OER and increase the production of hydrogen from water. In particular, oxides of ruthenium and iridium have previously been identified. However, as they are among the rarest elements on earth, it is not practical to use these catalysts on a large scale. Therefore, improved OER catalysts would be very useful in the development of hydrogen as an alternative fuel source.

SUMMARY OF THE INVENTION

In one aspect there is disclosed an oxygen evolution catalyst splitting water into oxygen and hydrogen ions that includes hydrated cobalt tungstate.

In another aspect there is disclosed a process for oxidizing water to produce oxygen. The process includes placing water in contact with hydrated cobalt tungstate, the hydrated cobalt tungstate catalyzing the oxidation of water and producing oxygen. The hydrated cobalt tungstate can be a plurality of hydrated cobalt tungstate nanoparticles which may or may not be attached to an electrode with an electrical potential applied between the electrode and the water to generate oxygen.

In a further aspect, there is disclosed a process of forming an oxygen evolution catalyst including the steps of: providing $Co(NO_3)_4$; providing $Na_2WO_4$; combining the $Co(NO_3)_4$ and $Na_2WO_4$ forming a solution; exposing the solution to a source of microwave energy and initiating a hydrothermal reaction forming hydrated $CoWO_4$.

DETAILED DESCRIPTION OF THE PREFERRED EMBODIMENTS

The present disclosure provides a method of forming, apparatus and/or catalyst composition for the oxidation of water to generate oxygen gases. The method includes providing a hydrated cobalt tungstate ($CoWO_4$) catalyst material and adding the catalyst to water under a condition effective to generate oxygen. In one embodiment, the method further includes exposing the water, which contains the catalyst, to light radiation to generate oxygen gases.

A "catalyst" as used herein, means a material that is involved in and increases the rate of a chemical electrolysis reaction (or other electrochemical reaction) and which itself, undergoes reaction as part of the electrolysis, but is largely unconsumed by the reaction itself, and may participate in multiple chemical transformations. A catalytic material of the invention may be consumed in slight quantities during some uses and may be, in many embodiments, regenerated to its original chemical state. The reaction may include a water oxidation or oxygen evolution reaction.

In one aspect a water oxidation catalyst or an oxygen evolution catalyst includes hydrated cobalt tungstate that splits water into oxygen and hydrogen ions.

In a further aspect there is disclosed an electrode for electrochemical water oxidation splitting water into oxygen and hydrogen ions that includes a substrate and an active material in contact with the substrate. The active material includes hydrated cobalt tungstate.

In one aspect, the hydrated cobalt tungstate may be combined with conductive particles such as carbon black and may also include a binder such as NAFION®, a sulfonated tetrafluoroethylene based fluoropolymer copolymer sold by DuPont. The combined material may be attached to an electrode substrate using any method known to those in the art. Various electrode substrates may be utilized that are capable of conducting current such as for example, glassy carbon, carbon black or other materials.

The catalyst can include a plurality of hydrated cobalt tungstate nanoparticles. In some instances, the nanoparticles are uniform in size and can have an average particle size of 1 to 10 nm. In one aspect, the oxygen evolution catalyst including the plurality of hydrated cobalt tungstate nanoparticles may have a surface area of from 40-110 m$^2$/g.

In one embodiment, the hydrated cobalt tungstate is attached to an electrode using any method known to those in the art. For example for illustrative purposes only, absorption techniques, adhesives, deposition techniques and the like can be used to attach the hydrated cobalt molybdenum to the electrode.

In some instances, the electrode can have channels and water can be brought into contact with the catalyst at a rate that allows the water to be incorporated into the electrode channels. In addition, the electrode can be in an aqueous solution and/or be part of an electrochemical cell and/or part of a photo-electrochemical cell, which may or may not include a container.

The container may be any receptacle, such as a carton, can or jar, in which components of an electrochemical device may be held or carried. A container may be fabricated using any known techniques or materials, as will be known to those of ordinary skill in the art. The container may have any shape or size, providing it can contain the components of the electrochemical device. Components of the electrochemical device may be mounted in the container. That is, a component, for example, an electrode, may be associated with the container such that it is immobilized with respect to the container, and in some cases, supported by the container.

In some instances, an electrochemical cell containing an embodiment of the present invention offers a highly efficient method of splitting water using solar illumination, without the need for an applied potential. Upon oxidation of water at a photo-anode, hydrogen protons are generated which are then reduced to form hydrogen gas at a counter electrode. In addition, the oxygen and hydrogen generated from the cell can be passed directly to a fuel cell to generate further power.

In a further embodiment, the electrochemical cell can be driven either by a photo-anode such as a dye sensitized semiconductor or an external potential. The dye sensitized semiconductor acts as a chemical/photo-electrical relay system. For example and for illustrative purposes only, FIG. 1 illustrates a sequence of electron transfer that can occur in a photo-electrical relay system. Examples of such relay systems include ruthenium N-donor dyes such as ruthenium polypyridal dyes that can absorb visible light and accept electrons from a hydrated cobalt molybdenum catalyst material and thereby assist in the oxidation of water that is in contact with the catalyst. In some instances, the photo-sensitizer can be a ruthenium-tris(2,2'-bipyridyl) compound such as ruthenium-tris(2,2'-bipyridyl) chloride.

Figure 6:
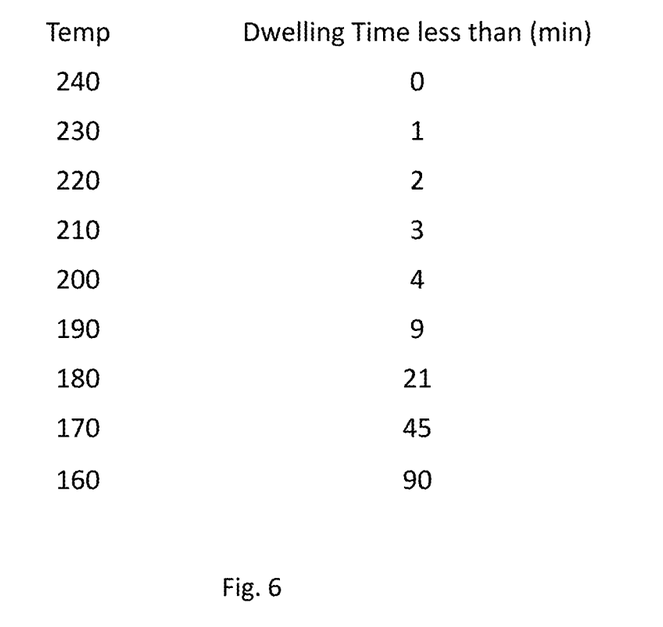
FIG. 6 is a table of the temperature and dwell time to produce hydrated $CoWO_4$.

In another aspect, there is disclosed a process of forming an oxygen evolution catalyst including the steps of: providing $Co(NO_3)_4$; providing $Na_2WO_4$; combining the $Co(NO_3)_4$ and $Na_2WO_4$ forming a solution; exposing the solution to a source of microwave energy and initiating a hydrothermal reaction forming hydrated $CoWO_4$. The exposing step may include exposure to microwave energy for various periods of time to elevate the temperature or heat the solution to a desired temperature range. Various time and temperature values are displayed in FIG. 6 to form the hydrated $CoWO_4$ material.

The exposing step may include exposing the solution to microwave energy from less than one minute to 60 minutes. In one aspect, the exposing step may be from 1 to 10 minutes at a power of 800 Watts. The exposing step may raise the temperature of the solution to a temperature of from 200 to 300 degrees C. Following the exposing step the solution may be cooled and then washed and dried.

Figure 4:
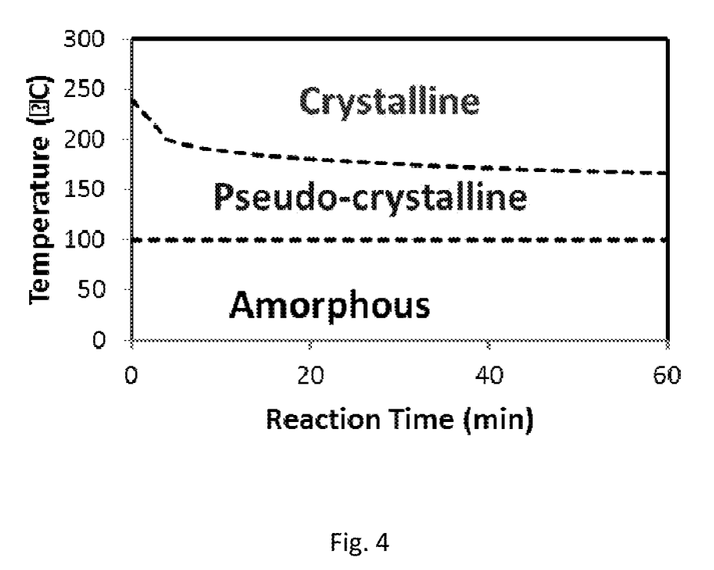
FIG. 4 is a plot of the reaction or dwell time in the microwave and temperature to form amorphous, crystalline and pseudo-crystalline or hydrated phases of $CoWO_4$.

The process of forming an oxygen evolution catalyst produces a material that has a pseudo crystalline phase or a hydrated crystalline phase, that provides an increased stability and activity of the catalyst as will be discussed in more detail below. The hydrated phase may be formed at temperatures ranging from 100-240 and dwell times of from less than one minute to 60 minutes as shown in FIG. 4.

The invention is further described by the following examples, which are illustrative of specific modes of practicing the invention and are not intended as limiting the scope of the invention defined in the claims.

EXAMPLES

Preparation of Hydrated $CoWO_4$

Starting materials of $Co(NO_3)_4$ $6H_2O$ and $Na_2WO_4.2H_2O$ were purchased from Sigma-Aldrich and used directly without further purification. In a typical synthesis a (0.2M) $Na_2WO_4$ solution was combined with a (0.2M) $Co(NO_3)_2$ solution in a stoichiometric manner with strong agitation. The solution mixture was then placed into a glass microwave tube. A microwave assisted hydrothermal synthesis was conducted on a microwave reactor (Anton Paar Microwave 300). The microwave tube was heated to various temperatures at max power (800 W). The exposure to microwaves was maintained for various times as will be discussed in more detail below. Following the exposure to microwaves the tube was cooled by forced air flow. The resulting product was rinsed with DI water multiple times on a centrifuge followed by vacuum drying overnight at 60 degrees C.

Figure 1A:
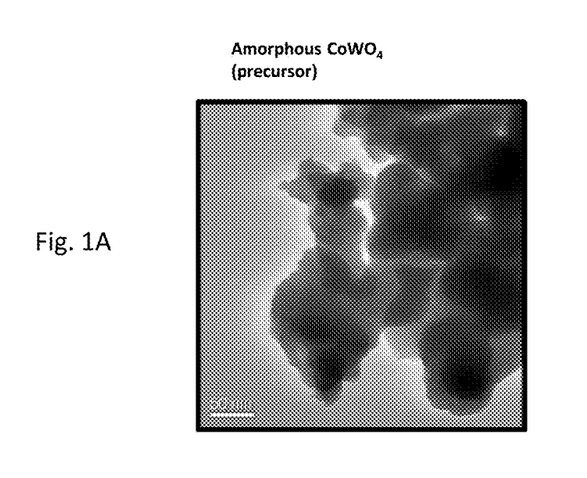
FIG. 1A is a transmission election microscopy (TEM) image of amorphous $CoWO_4$ nanoparticles.
Figure 1B:
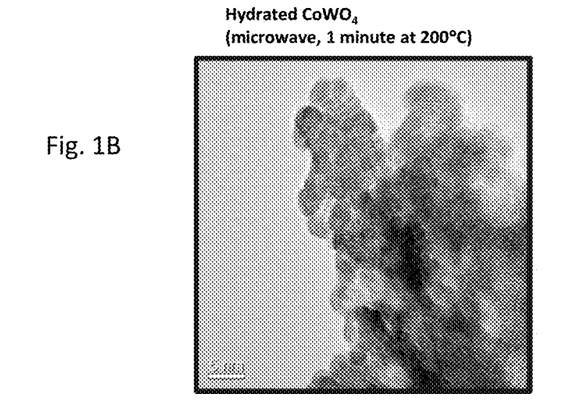
FIG. 1B is a transmission election microscopy (TEM) image of hydrated $CoWO_4$ nanoparticles with a microwave dwell time of 1 minute.
Figure 1C:
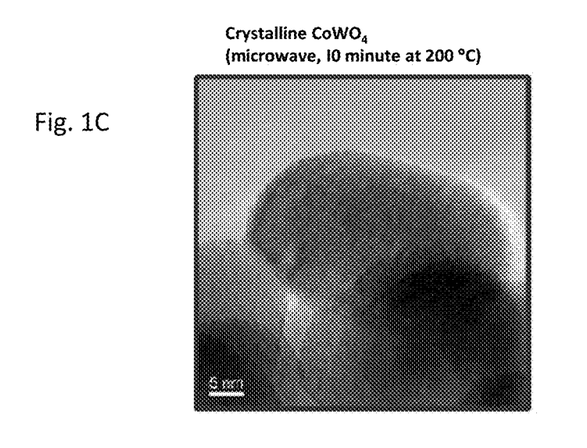
FIG. 1C is a transmission election microscopy (TEM) image of crystalline $CoWO_4$ nanoparticles with a microwave dwell time of 10 minutes.
Figure 2:
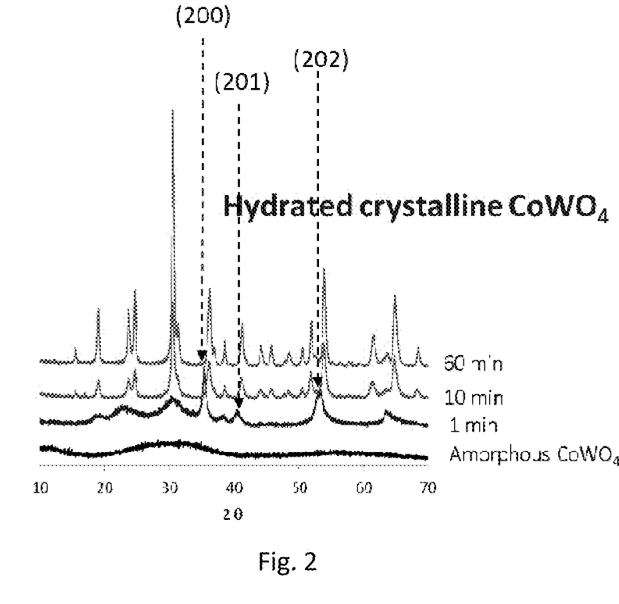
FIG. 2 is an XRD plot of hydrated $CoWO_4$ nanoparticles and amorphous $CoWO_4$ particles.

A final powder product was examined by TEM as shown in FIGS. 1A-C. It can be seen in the Figures that the hydrated $CoWO_4$ particles had a much smaller size in comparison to amorphous $CoWO_4$ particles.

Figure 3:
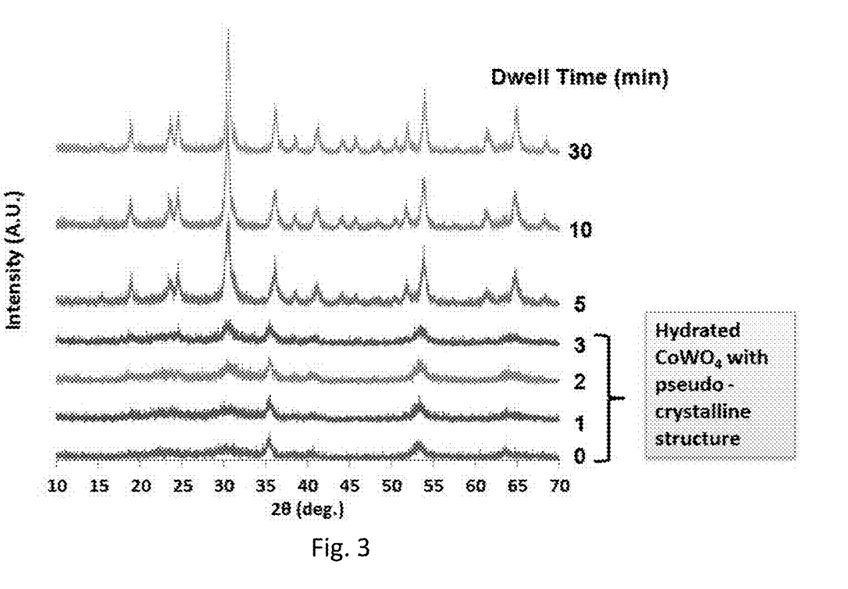
FIG. 3 is an XRD plot of $CoWO_4$ nanoparticles synthesized at 200° C. for different microwave dwelling time.
Figure 5:
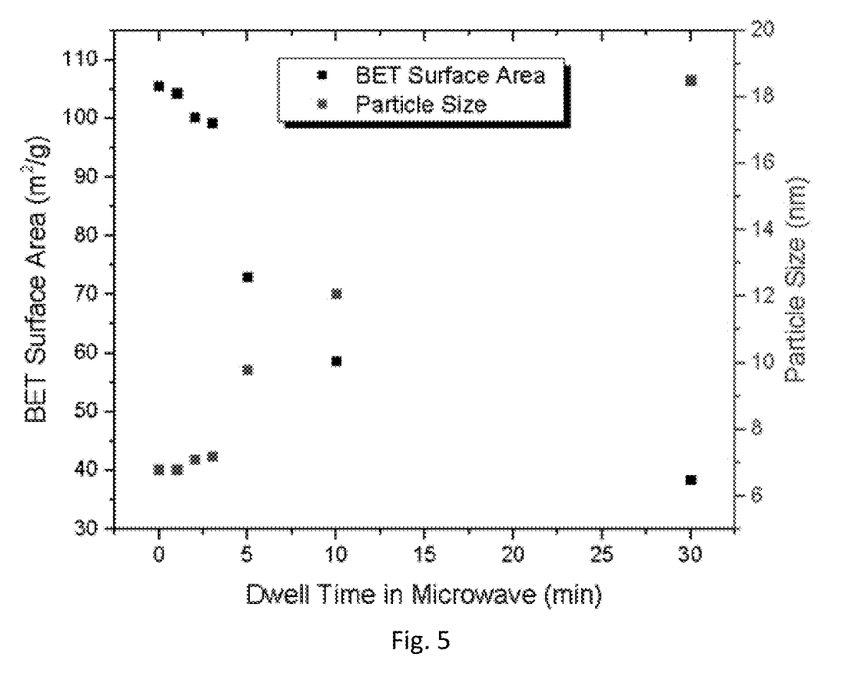
FIG. 5 is a plot of the surface area and particle size for $CoWO_4$ as a function of the dwell time in the microwave.

XRD data is shown in FIGS. 3 and 4 for hydrated $CoWO_4$ with various exposure times to microwave energy and amorphous $CoWO_4$. The plots for the samples having exposure times of from 0 to 3 minutes display a unique pseudo-crystalline phase with differing height and shifted peaks in comparison to the longer exposed samples. Additionally, the samples having an exposure time less than 5 minutes have an increased surface area, as best seen in FIG. 5.

Example II

Cyclic Voltammetry (CV) of $CoWO_4$

To fabricate a working electrode, a catalyst ink was first prepared by sonicating a mixture of catalyst particles, acid-treated carbon black (CB), Na+-exchanged Nafion1 solution with tetrahydofuran, and then drop-casting (10 mL) onto pre-polished glassy carbon disk electrodes (5 mm in diameter). The catalyst film was allowed to dry at room temperature in a sealed container overnight and the final composition of the as expected to be 250, 50 and 50 mg cm22 for $CoWO_4$, CB and Nafion1, respectively.

The electrochemical measurements were done in a three-electrode glass cell (125 ml) with the working electrode rotating at a rate of 1600 rpm, and Ag/AgCl (3M NaCl) as the reference. The counter electrode (Pt coil) was isolated from the main electrochemical cell using a fritted glass tube. The electrolyte utilized was of 0.4 M $Na_2HPO_4$ and 0.6 M $Na_2SO_4$, the pH of which was adjusted using NaOH or $HNO_3$ solutions. During the electrochemical tests, the electrolyte was continuously purged and masked with ultra-high purity oxygen.

Figure 7A:
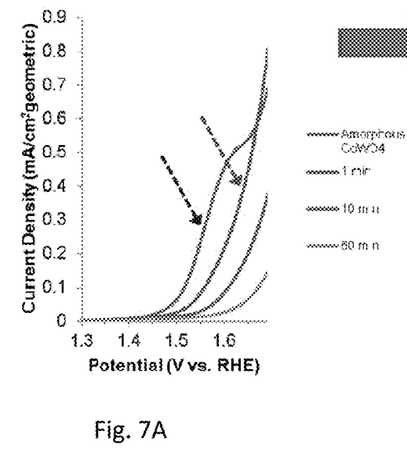
FIG. 7A is a graphical representation of cyclic voltammetry traces using a scan rate of 5 mV/s for $CoWO_4$ for one cycle.
Figure 7B:
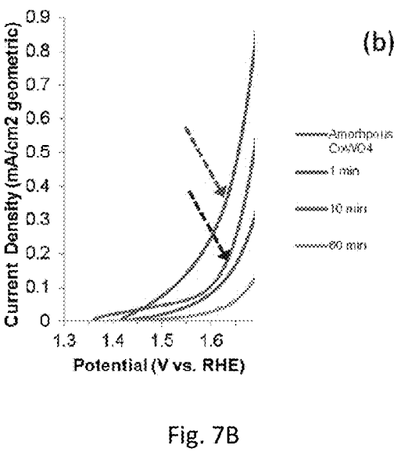
FIG. 7B is a graphical representation of cyclic voltammetry traces using a scan rate of 5 mV/s for $CoWO_4$ after 20 cycles.

Cyclic voltammogram plots for the $CoWO_4$ particles after one cycle, and after 20 cycles for amorphous $CoWO_4$ and various hydrated $CoWO_4$ samples are shown in FIGS. 7A and B. As shown in the figures, the hydrated $CoWO_4$ particles after 20 cycles have an increased performance in comparison to amorphous $CoWO_4$ particles. The hydrated $CoWO_4$ particles demonstrate an increased stability after repeated CV cycles. In one aspect, the hydrated $CoWO_4$ maintains 100_percent of its activity after 20 charge cycles.

Figure 8:
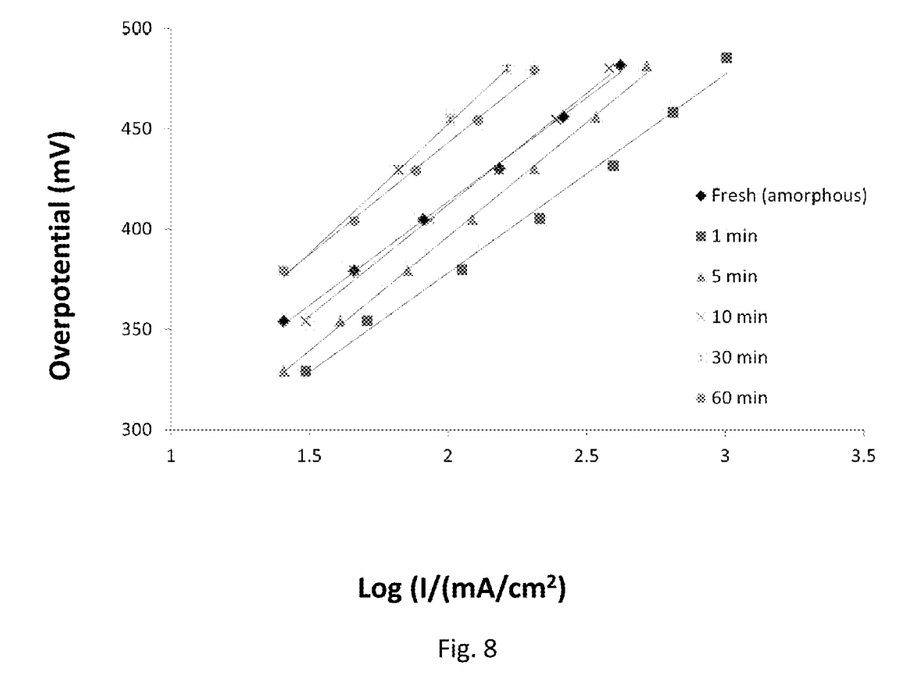
FIG. 8 is a Tafel plot of the of hydrated $CoWO_4$ (1 min), crystalline (5-60 min) and amorphous $CoWO_4$.

Tafel plot measurements, as shown in FIG. 8 of hydrated and amorphous $CoWO_4$ show that hydrated $CoWO_4$ has better performance per unit of electrode surface area than amorphous $CoWO_4$ under the same conditions and applied over-potential at steady state. The performance characteristics of the hydrated $CoWO_4$ indicate an improved electrochemical catalyst for splitting water than may be produced in a large scale using a microwave assisted hydrothermal reaction.

Figure 9:
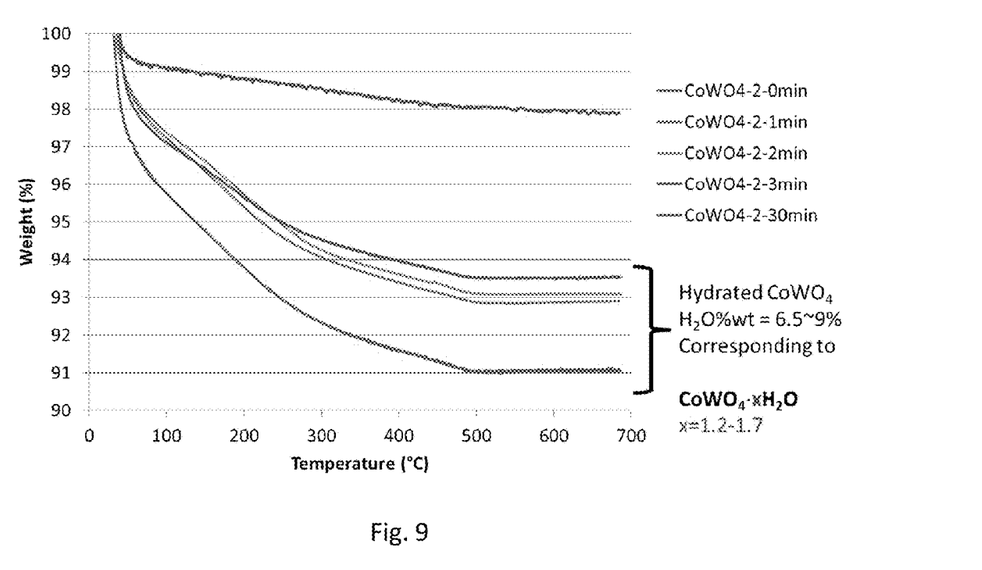
FIG. 9 is a graphical plot of TGA data for hydrated $CoWO_4$.

Referring to FIG. 9, there is shown a plot of the TGA analysis of the hydrated $CoWO_4$ particles. The Total weight loss due to water by TGA was found to be approximately 6.5 to 9 percent with an atomic ratio of $CoWO_4 x\, H_2O$ wherein x is 1.2 to 1.7.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, we claim:

1. An oxygen evolution catalyst splitting water into oxygen and hydrogen ions comprising hydrated Cobalt Tungstate having a hydrated pseudo crystalline phase of the formula: $CoWO_4\, xH_2O$ wherein x is 1.2 to 1.7.

2. The oxygen evolution catalyst of claim 1 wherein the hydrated Cobalt Tungstate includes a plurality of nanoparticles having a size of from 1 to 10 nm.

3. The oxygen evolution catalyst of claim 1 further including conductive particles and a binder combined with nanoparticles of the hydrated Cobalt Tungstate.

4. The oxygen evolution catalyst of claim 1 wherein the catalyst has a surface area of from 40-110 $m^2/g$.

5. The water oxidation catalyst of claim 1 wherein the catalyst maintains 100% of its activity following 20 charge cycles.

6. The water oxidation catalyst of claim 1 wherein the hydrated Cobalt Tungstate has a steady state activity greater than amorphous Cobalt Tungstate.

7. A process for oxidizing water, the process comprising:
providing hydrated Cobalt Tungstate having a hydrated pseudo crystalline phase of the formula: $CoWO_4\, xH_2O$ wherein x is 1.2 to 1.7;
providing water; and
placing the water into contact with the hydrated Cobalt Tungstate, the hydrated Cobalt Tungstate catalyzing the oxidation of water.

8. The process of claim 7, wherein the hydrated Cobalt Tungstate is a plurality of hydrated Cobalt Tungstate nanoparticles.

9. The process of claim 8, further including applying an electrical potential between the hydrated Cobalt Tungstate and the water.

10. The process of claim 8, further including adding a photo-sensitizer to the water and exposing the water with photo-sensitizer to electromagnetic radiation, the photo-sensitizer providing an electrical potential between the hydrated Cobalt Tungstate and the water.

11. The process of claim 10, wherein the photo-sensitizer is a ruthenium-tris(2,2'-bipyridyl) compound.

12. A process for forming an oxygen evolution catalyst including the steps of:
providing $Co(NO_2)_4$;
providing $Na_2WO_4$;
combining the $Co(NO_3)_4$ and $Na_2WO_4$ forming a solution;
exposing the solution to a source of microwave energy and initiating a hydrothermal reaction forming hydrate $CoWO_4$ having a hydrated pseudo crystalline phase of the formula: $CoWO_4\, xH_2O$ wherein x is 1.2 to 1.7.

13. The process of claim 12 wherein stoichiometric amounts of $Co(NO_3)_4$ and $Na_2WO_4$ are combined.

14. The process of claim 12 wherein the exposing step is from 1 to 10 minutes.

15. The process of claim 12 wherein the exposing step includes elevating the solution to a temperature of from 200 to 300 degrees C.

16. The process of claim 12 including the step of cooling the solution following the exposing step.

17. The process of claim 12 further including the step of washing and drying the hydrated $CoWO_4$ following the hydrothermal reaction.

* * * * *

UNITED STATES PATENT AND TRADEMARK OFFICE
CERTIFICATE OF CORRECTION

PATENT NO. : 10,040,050 B2
APPLICATION NO. : 14/528219
DATED : August 7, 2018
INVENTOR(S) : Hongfei Jia and Kenneth James McDonald It is certified that error appears in the above-identified patent and that said Letters Patent is hereby corrected as shown below:

In the Specification

In Column 4, Line 62, delete "the as expected" and insert --the film was expected--, therefor.

Signed and Sealed this
Second Day of October, 2018

Andrei Iancu
*Director of the United States Patent and Trademark Office*